(No Model.) 2 Sheets—Sheet 1.
G. R. BALDWIN.
ELECTRIC METER.
No. 461,229. Patented Oct. 13, 1891.
Fig. 1. Fig. 2.
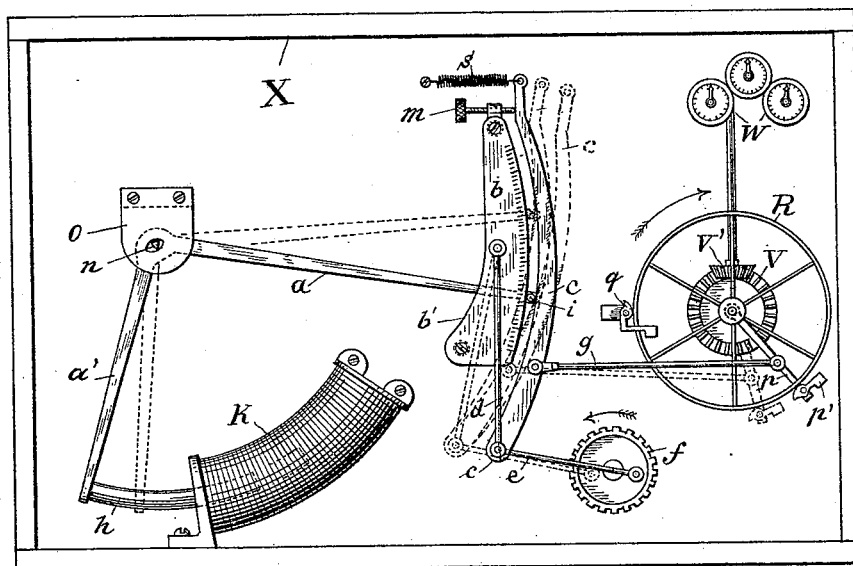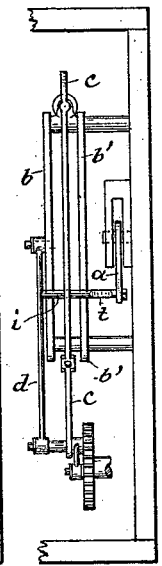
Fig. 3.
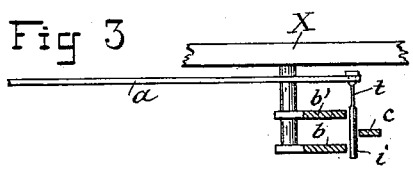
Fig. 4.
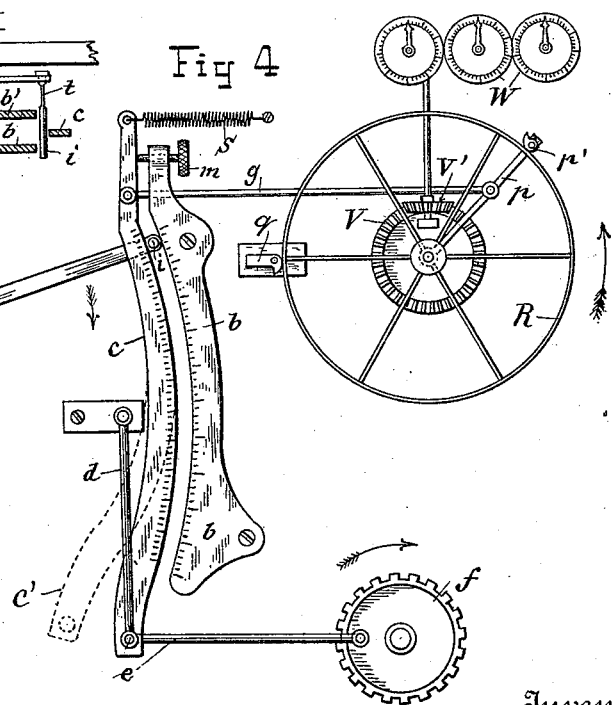
Witnesses
Chas Hanimann
Inventor
George R. Baldwin
By his Attorney (No Model.)  G. R. BALDWIN.  2 Sheets—Sheet 2.
ELECTRIC METER.

No. 461,229.  Patented Oct. 13, 1891.

Witnesses
Chas. Hanimann.
N. L. Lugues

Inventor
George R. Baldwin
By his Attorney
A. P. Smith

UNITED STATES PATENT OFFICE.

GEORGE READE BALDWIN, OF NEW YORK, N. Y.

ELECTRIC METER.

SPECIFICATION forming part of Letters Patent No. 461,229, dated October 13, 1891.

Application filed November 20, 1890. Serial No. 371,982. (No model.)

*To all whom it may concern:*

Be it known that I, GEORGE READE BALDWIN, a citizen of the United States, residing at New York, in the county of New York and State of New York, have invented certain new and useful Improvements in Electric Meters; and I do hereby declare the following to be a full, clear, and exact description of the invention, such as will enable others skilled in the art to which it appertains to make and use the same.

My invention relates to that class of apparatus designed to register the amount of current passing in any given period of time through a given electric circuit with which said apparatus is connected.

Figure 5:
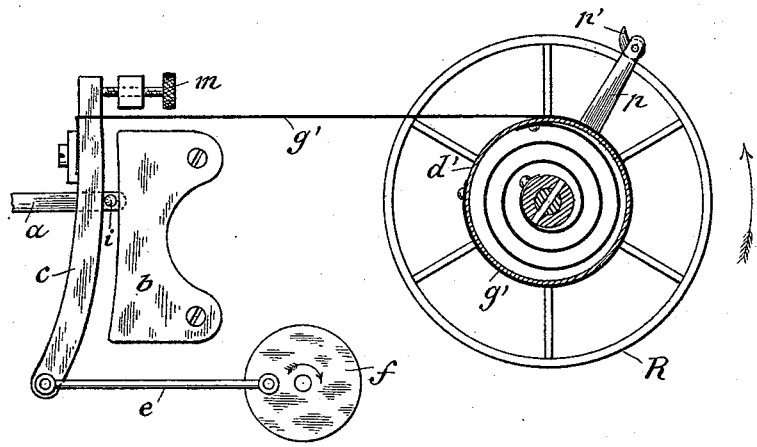
Figure 6:
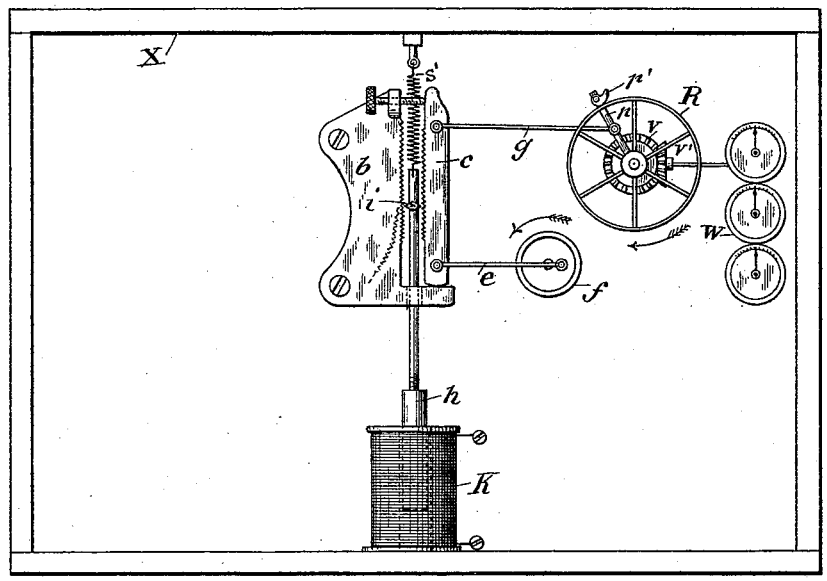

In the drawings, Figure 1 is a plan view of my meter in its case. Fig. 2 is an end view, some of the parts being omitted. Fig. 3 is a detail; and Figs. 4, 5, and 6 are modifications.

In the construction of an electric meter the two important points to be kept in view are simplicity of organizations and accuracy of registration. To assure the latter, it is necessary that the current-indicating member of the meter shall be left free to move at the slightest change in the strength of the current without friction and without being called upon to do any work. To secure the former, it is desirable, among other things, that there shall be one piece in the mechanism which may be so shaped as to counteract the various errors of cheap registering devices, the sum of the corrections for all parts of the meter being determined empirically and accounted for in the proper designing of this one piece. To accomplish these objects, I have hit upon the plan of employing a lever with a movable fulcrum, the movable fulcrum being controlled by any proper current-indicating device, while one end of the lever is reciprocated through a given distance at regular intervals by clock-work, and a registering device of any one of the well-known types is connected to a fixed point in said lever and operated to a greater or less extent at said regular intervals, according to the position of the fulcrum of the lever. It is evident that a great variety of constructions could be employed to carry out this idea, and I do not wish to limit myself to any particular form of mechanism; but that one which at the present time seems to me to best embody my invention is the one illustrated in the accompanying drawings, in which—

X represents the case, which contains the works of the meter. To one side of this case is fastened the coil of wire K, through which the current to be measured is passed. The movable armature or core $h$, which is within the magnetic field of force of said coil, is supported on an arm $a'$ of the pointer or swinging needle $a$. This needle swings in the bearing $o$ on the knife-edge $n$. The pointer or needle $a$ has an extension $i$, which by means of the thin portion $t$, Fig. 3, is rendered extremely flexible. This flexible extension $i$ moves back and forth before a backing-piece composed of the plates $b\ b'$, whose faces are curved to an arc struck from the center about which the pointer $a$ swings. The lever $c$ is curved to an arc concentric with that of the plates $b\ b'$. One end is supported by the link $d$ and the other is pressed against the adjusting-screw $m$ by the spring S. In the normal position of this lever there is left a narrow path between it and the backing-piece, along which the projection $i$ from the pointer may travel freely. The reciprocating piece or link $e$ extends from the lever to the gear $f$, which may represent any piece of clock-work mechanism and is given a revolution at regular intervals.

The plates $b\ b'$ are placed at a suitable distance apart so as not to interfere with the motion of the lever $c$, as shown in Figs. 2 and 3. In the modification shown in Fig. 4 the positions of lever and backing-piece are reversed, and the movable fulcrum formed by extension $i$ is between the clock-work and register connections, while in Fig. 1 the register connection to the lever is between the other two.

In Fig. 4, $c'$ in dotted lines shows the lever bent from regular curvature to compensate for errors in other parts of the mechanism.

In Fig. 5 the strap $g'$ and spring-drum $d'$ are shown as a substitute for the connecting-rod $g$, thus eliminating the error due to what is known as the "angularity" of the connecting-rod $g$ and crank $p$, as shown in Figs. 1 and 4.

A scale to indicate the amount of current passing at any instant may be marked on plate $b$ or lever $c$, or upon both, as shown in Fig. 4.

The operation of my invention is as follows: The varying strength of the current passing through coil $k$ will draw core $h$ more or less into the coil and swing the pointer $a$. The screw $m$ adjusts lever $c$ so that there is just room to allow the extension $i$ on said pointer to move freely along its path. At regular intervals the clock-work rotates pinion $f$ and swings lever $c$ into the position shown in dotted lines, Fig. 1. As the lever swings it forces extension $i$ against the face of plates $b$ $b'$ and uses it as a fulcrum. The position of this fulcrum of course determines the amplitude of motion of the link $g$, and the registering device moves up a number of units corresponding to the strength of the current at that instant. The reading of the dials at the end of any period of time is the summation of these constantly-recurring current-registrations, and consequently represents the amount of current used during that period, supposing the meter to have been first set at zero. The curved lever $c'$ (shown in dotted lines, Fig. 4) would compensate for the error creeping into large registrations when the fulcrum $i$ is down toward the lower end of the lever $c$. In that case the increased motion of the connecting-rod $g$ would bring the crank $p$ nearly over to the dead-point, and the movement of the wheel R would be unduly accelerated. The curvature of lever $c'$ would allow it to travel some distance before it came to a bearing on the fulcrum at that point, and thus the error would be compensated. Other errors might all be counteracted in a similar way by giving lever $c$ the necessary irregularity of shape, departing from the exact arc of curvature.

The counting or registering mechanism is operated by the link $g$, which vibrates the lever-arm $p$. On this lever-arm is the friction-dog $p'$, which binds upon the face of the wheel R by gravity and causes the wheel R to revolve from right to left, as indicated by the arrow. The stationary friction-dog $q$ acts as a check to prevent the wheel revolving in the opposite direction. Bevel-gears V V' transmit the motion to the counting-disks W, which are geared together in the units, tens, and hundreds ratio in the well-known way. The mechanism illustrated in Fig. 5 is designed to operate in the same way, with the exception that the flexible strap $g'$ and spring-drum $d'$ (to which latter the lever, with the ratchet-dog, is attached) take the place of the rigid link $g$. Motion is thereby given to the wheel and transmitted to a set of counters by any convenient gearing.

The advantages of my invention are its simplicity of construction and its sensitiveness, which gives accuracy. The pointer $a$ may be made of extreme lightness and turn on the finest knife-edge, so that the movable fulcrum $i$ shall respond to the slightest change of current. The flexible portion $t$ allows the pin or extension $i$ to be brought to a bearing on the backing-piece $b$ without unseating the knife-edge $n$. The work is all done by the clock-work-driven mechanism, and between every two registrations the current-indicating device is left devoid of friction to adjust itself to the slightest change in phase of the current.

As before stated, I am aware that many variations might be made in the mechanism without departing from the spirit of my invention.

In cheap meters the knife-edge $n$ might be replaced by a pivot and the backing-piece $b$ $b'$ done away with, the needle and extension $i$ being made strong enough to stand alone. In place of the lever any suitable form of link intermediate between the clock-work and registering device may be used.

By turning the construction shown in Fig. 4 on its side the spring S might be left off, the weight to the lever $c$ doing the work of the spring. The fulcrum $i$ might be connected direct to armature $h$ and move in a straight instead of a curved line; but all these forms of mechanism and others unnecessary to mention operate upon the same principle as the construction illustrated and are within the scope of my invention.

In Fig. 6 another of the above-indicated modifications is illustrated. The swinging pointer $a$ is done away with and the armature $h$ acts directly upon the movable fulcrum $i$, which is connected to the spring $s'$. The lever $c$ is straight, and the backing-piece may also be straight, or it may be given a curvature to compensate for errors in other portions of the mechanism, as is indicated in dotted lines, Fig. 6, in the same manner as the lever is bent in Fig. 4. The adjacent faces of lever and backing-plate are corrugated to prevent the pin $i$ from slipping, and said pin is made diamond-shaped to fit into said corrugations.

Having therefore described my invention, what I claim as new, and desire to protect by Letters Patent, is—

1. In an electric meter, the combination of a lever, an adjustable fulcrum for said lever, a current-indicating device which controls said fulcrum, a rigid backing-piece by which said adjustable fulcrum is supported when the lever is forced down upon it, a registering device, and a clock-work, each connected to said lever, substantially as described.

2. In an electric meter, the combination of the lever, an adjustable fulcrum for said lever, a current-indicating device which controls the adjustment of said fulcrum, a rigid backing-piece, before and near to the face of which the adjustable fulcrum moves, but without touching it, except when pressed by the lever, a registering device, and a clock-work, each connected to said lever, substantially as described.

3. In an electric meter, the combination of a lever, an adjustable fulcrum for said lever, which fulcrum consists of a flexible projection from a movable piece, a current-indicating device which controls the position of said movable piece, a rigid backing-piece, before and near to the face of which the flexible projection moves, but without touching it, except when forced down upon it by the lever, a clock-work, and a registering device respectively operating and operated by said lever, substantially as described.

4. In an electric meter, the combination of a clock-work, a registering device, an intermediate link and connections through which the clock-work operates the registering device, a backing-piece, and a flexible pointer moving in front of and near to said backing-piece, said parts being so placed with reference to the intermediate link above mentioned as to control its motion, together with the current-indicating device by which said pointer is moved, substantially as described.

5. In an electric meter, the combination of a clock-work, a registering device, an intermediate link and connections through which the clock-work operates the registering device, a backing-piece which has a corrugated face, a pointer moving in front of and near to said corrugated face, said pointer being so arranged with reference to the intermediate link above mentioned as to control its motion, and the current-indicating device by which said pointer is moved, substantially as described.

6. In an electric meter, the combination of the spring-pressed lever, the backing-piece composed of two plates, between which said lever may enter, a current-indicating device, and a pin moved back and forth thereby along between said lever and backing-piece, a clock-work which actuates said lever at regular intervals, and a registering device operated by said lever, substantially as described.

7. In an electric meter, the combination of the lever, the adjusting-screw, and the spring which normally holds one end of the lever against the screw, the adjustable current-controlled fulcrum for said lever, and the clock-work, and the registering device, substantially as described.

8. In an electric meter, the combination of a coil of wire through which the current to be measured passes, a swinging pointer to which is attached an armature controlled by the magnetic action of said coil, a flexible projection on said pointer, a rigid backing-piece which is curved to an arc whose center is the pivotal point of the needle or pointer and which is so placed that the flexible projection oscillates back and forth before its curved face with the movements of the pointer, a spring-pressed lever normally held adjacent to said backing-piece, the flexible projection from the pointer being between them, the clock-work actuating said lever at regular intervals so as to press the flexible extension against the backing-piece, and the registering device connected to said lever and operated thereby at said intervals to a greater or less extent, according to the position of the flexible extension from the swinging pointer, said extension serving as a fulcrum for said lever, substantially as described.

9. The combination of a lever, a registering device having a fixed pivotal connection to said lever, a clock-work having a fixed pivotal connection to said lever, an adjustable fulcrum for said lever, and a current indicating device controlling the adjustment of said fulcrum, substantially as described.

In testimony whereof I affix my signature in presence of two witnesses.

GEORGE READE BALDWIN.

Witnesses:
WARREN W. FOSTER,
H. L. LUQUES.